United States Patent
Addy

(10) Patent No.: US 8,054,199 B2
(45) Date of Patent: Nov. 8, 2011

(54) ALARM REPORTING THROUGH UTILITY METER READING INFRASTRUCTURE

(75) Inventor: Kenneth Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 170 days.

(21) Appl. No.: 12/550,566

(22) Filed: Aug. 31, 2009

(65) Prior Publication Data

US 2011/0050455 A1    Mar. 3, 2011

(51) Int. Cl.
G08B 23/00    (2006.01)
(52) U.S. Cl. ............... 340/870.02; 340/500; 340/540; 340/577
(58) Field of Classification Search .......... 340/870.02, 340/500, 540, 541, 577; 307/39
See application file for complete search history.

(56) References Cited

U.S. PATENT DOCUMENTS

| | | | |
|---|---|---|---|
| 5,923,269 A | 7/1999 | Shuey et al. | |
| 7,304,587 B2 | 12/2007 | Boaz | |
| 7,479,895 B2 | 1/2009 | Osterloh et al. | |
| 2001/0055965 A1 | 12/2001 | Delp et al. | |
| 2008/0133679 A1* | 6/2008 | Addy | 709/206 |
| 2008/0302172 A1* | 12/2008 | Kates | 73/40.5 R |
| 2009/0167558 A1* | 7/2009 | Borleske et al. | 340/870.07 |
| 2009/0211986 A1* | 8/2009 | Kates | 210/742 |

FOREIGN PATENT DOCUMENTS

| | | |
|---|---|---|
| DE | 10 2005 023 485 A1 | 11/2006 |
| EP | 1 571 422 A2 | 9/2005 |
| WO | WO 2007/135233 A1 | 11/2007 |

OTHER PUBLICATIONS

European Search Report corresponding to Application No. EP 10 17 2715, dated Nov. 10, 2010.
English translation of abstract of DE102005023485 (A1).

* cited by examiner

Primary Examiner — Albert Wong
(74) Attorney, Agent, or Firm — Husch Blackwell

(57) ABSTRACT

A system is provided that includes a utility meter of a utility company that measures consumption of a utility within a space occupied by a user, a wireless fault detector associated with the utility located within the space and a wireless transmitter of the utility meter that receives a fault message from the fault detector, confirms consumption of the utility within the space and transmits a fault message that identifies the space to the utility company.

21 Claims, 2 Drawing Sheets

ALARM REPORTING THROUGH UTILITY METER READING INFRASTRUCTURE

FIELD OF THE INVENTION

The field of the invention relates to utility meters and more particularly to smart meters used by utility companies.

BACKGROUND OF THE INVENTION

Smart utility meters are generally known. In the context of electrical consumption, smart meters have been developed as a mechanism to help match consumption with generation of electricity. Traditional electric meters only measure total consumption and fail to provide any information about when the electricity was consumed. Smart electrical meters provide an economical means for determining when the electricity was consumed thereby allowing governmental price setting organizations to set prices for consumption based upon the time of day and season.

Electrical loading usually peaks at certain predictable times of the day and season. For example, higher prices may be imposed at the start of the work day or on hot summer days when the air conditioning loading is very high. In these cases, a local electric utility may not have enough low-cost generating capacity. Prices can rise significantly during these periods both for the electric utility and consumer as more expensive sources of power are brought on-line or power is purchased from other regions with excess capacity.

In addition to pricing based upon time of day, it has also become possible for utilities to offer price reductions where consumers are willing to reduce consumption during peak periods. For example, some utilities provide automatic control systems for homes that allow the utility to temporarily deactivate heavy loads (e.g., air conditioning) for short periods.

The communication infrastructure that allows for the operation of smart meters in these cases opens up the opportunity for new ways of adding value to utility services. Accordingly, a need exists for better ways of using smart meters.

DETAILED DESCRIPTION OF AN ILLUSTRATED EMBODIMENT

Figure 1:
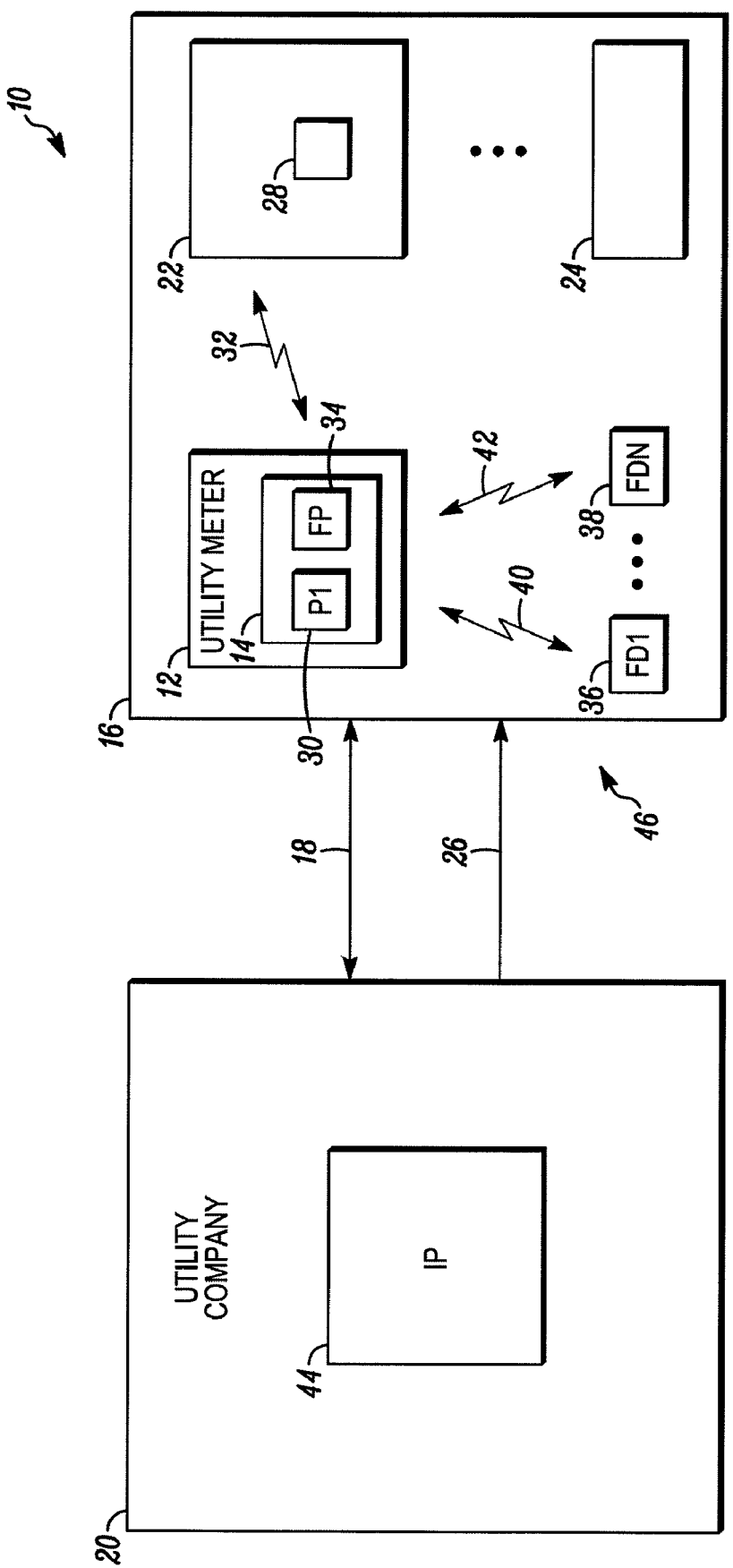
FIG. 1 is a block diagram of a smart utility meter system in accordance with an illustrated embodiment of the invention.

FIG. 1 is a block diagram of a smart utility meter system 10 shown in a context of use, generally in accordance with an illustrated embodiment of the invention. As shown in FIG. 1, the smart meter system 10 includes a utility meter 12 and an associated radio frequency transceiver and processor 14. The smart meter system 10 is located within a space (e.g., a residence) 16 of a subscriber (e.g., a user) of the utility.

In use, a utility company 20 may provide a utility 26 to the user space 16 through the utility meter 12 where the utility 26 is consumed within one or more utility consuming devices 22, 24. While only one utility company 20 and smart meter system 10 is shown in FIG. 1, it should be understood that a separate utility company 20 and smart meter system 10 may be provided for each electric, natural gas and water utility service. Similarly, the utility consuming devices 22, 24 could be any combination of utility consuming devices (e.g., lighting, gas or electric heating devices, clothes or dish washing machine, etc.).

The transceiver 14 of the smart meter system 10 may be coupled to the utility company 20 via a communication network 18. The communication network 18 may include the use of any of a number of different communication system technologies (e.g., cellular/pager networks, licensed radio, combination licensed and unlicensed radio, power line communications, etc.). In the case of residential use, the transceivers 14 of a number of spaces 16 within a neighborhood may be combined via a mesh network and connected at a common connection point to the utility company 20 through the use of a wireline connection of a public communication network.

In some ways the smart meter system 10 may operate conventionally. For example, a first, usage processor 30 within the transceiver 14 may be provided with a unique system identifier (e.g., electronic serial number, URL, etc.) that allows the transceiver 14 to receive meter read messages from an information processor 44 of the utility company 20 instructing the processor 30 read the utility meter 12. The meter read messages may include requests for cumulative readings or for consumption rates in units per time period (e.g., kilowatt/sec, gallons/sec, cubic feet of gas/sec, etc.), if the meter 12 is capable of providing such readings. Alternatively, the processor 30 may be programmed to periodically report a reading under a cumulative or instantaneous format.

The processor 30 may also receive load shedding instructions from the utility company 20. For example, in the case of an electric utility 20, the load shedding instruction may cause the processor 30 to transmit an instruction 32 to a controller 28 of an air conditioner 22 instructing the air conditioner 22 to shut-down for a predetermined period (e.g., 30) minutes during periods of heavy utility loading.

Under the illustrated embodiment, the transceiver 14 may also include processing features that operate to provide additional functionality. In this regard, the smart meter system 10 may be used for reporting faults within the space where the faults are associated with use of the utility 26. For example, the use of natural gas in the space 16 may result in a fault such as leaking natural gas where a pilot light goes out or a burner fails to properly ignite. The ability to detect gas leaks within the space 16 has a tremendous advantage in terms of reducing liability for the gas company and for the safety of the user and neighbors of the user.

Similarly, where the utility is water, then the ability to detect a fault (e.g., a water leak caused by a broken hose of a clothes washer, dishwasher, etc.) is also of value. In temperate climates, the ability of an electric utility to detect a fault such as freezing temperatures in the space 16 caused by failure of an electric heater is also of value.

Under this illustrated embodiment, one or more wireless fault sensors 36, 38 may be provided within the space 16. The sensors 36, 38 may be natural gas leak detectors, water leak detectors or even freeze detectors depending upon the utility provided by the company 20.

In this case, a fault processor 34 may be provided within the smart meter system 10 for purposes of detecting faults. When a fault detector 36, 38 detects a fault, the sensor may transmit a wireless fault signal 40, 42 to the fault processor 34 along with its own unique identifier. The fault processor 34, in turn, may compose a message (including the unique system identifier of the transceiver 14) and send the message to the company 20. Upon receipt of the message, the company 20 may take the appropriate action (e.g., send a service vehicle, alert a local fire department or police, etc.).

The fault detectors 36, 38 and processor 34 may be structured to operate in any of a number of different ways. Under one illustrated embodiment, the fault detectors 36, 38 and processor 34 may be small low-power radios and processors operating within a mesh network 46 under a mesh networking standard (e.g., ZigBee type devices based upon IEEE 802.15.4-2003 or equivalent).

Within the mesh, the processor 34 may periodically poll the detectors 36, 38. The detectors 36, 38 may respond with an acknowledgement message or with a fault message.

In the case where the detectors 36, 38 respond with a fault message, the processor 34 may save the fault message along with an identifier of the sensor 36, 38 that reported the fault. The processor 34 may wait for the next request for information from the utility company 20 or may report the fault immediately.

Alternatively, the processor 34 may retrieve a current usage level saved by the usage processor 30 and confirm consumption by comparing the current usage against some minimum threshold as a means of avoiding false alarms. Comparing the current usage against the minimum threshold may be used to avoid reporting a fault when the detected condition may be due to some other factor. For example, the detector 36, 38 may be intended to be used to detect water leaks for the benefit of a water utility company 20. However, the detector 36, 38 may also detect water due to heavy rains entering a basement. In this case, if a current usage does not exceed the minimum threshold (e.g., the owners of a resident 16 are away for the weekend and are not using any water), then the fault would not be reported to the utility company 20 or the fault may be reported along with indication that there is no current water usage.

Figure 2:
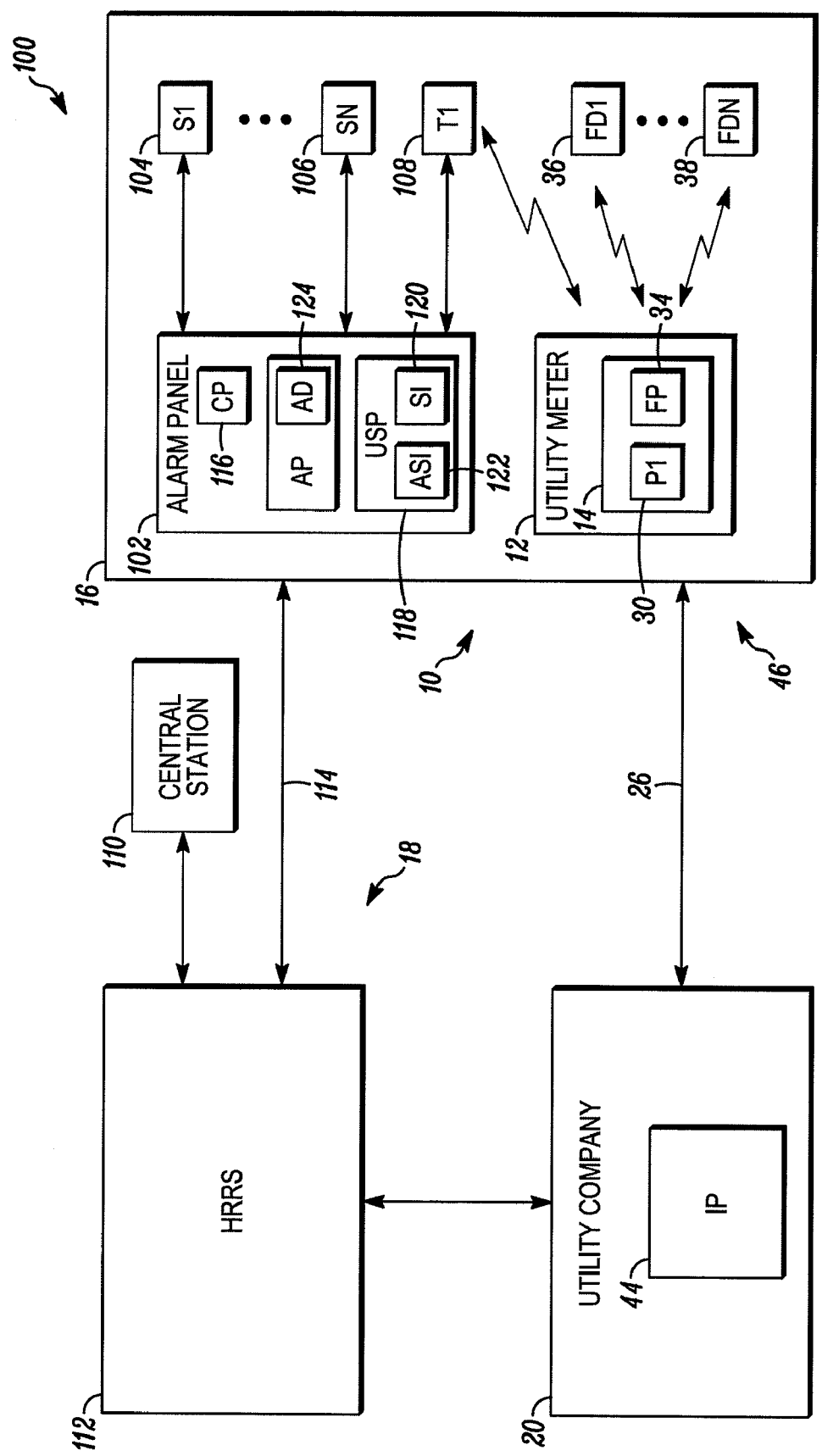
FIG. 2 is a block diagram of the smart utility meter system under an alternate embodiment.

In another illustrated embodiment, shown in FIG. 2, the communication system 18 is incorporated into a security system 100. In this case, the space 16 may be provided with an alarm panel 102 and a number of security sensors 104, 106 (e.g., door sensors, motion detectors, fire detectors, etc.). In the case of activation of one of the security sensors 104, 106, the alarm panel 102 sends an alarm message to a central monitoring station 110. The alarm message would include an identifier (e.g., an electronic serial number, URL, etc.) of the security panel 102 along with an identifier of the sensor 104, 106 and the type of sensor (e.g., intrusion, fire, etc.).

A responsible person at the central station 110 receives and reviews the alarm message and provides the appropriate response. An appropriate response may first be to place a call to the space 16 to confirm the alarm and if the alarm cannot be confirmed, then to alert the appropriate response entity. In the case of an intrusion alarm the response may be to alert a private security service or the local police. If the alarm is a fire or carbon dioxide indication, the response may, again, be a private security service or the local fire department.

As is known, many local security companies use a high reliability central reporting system (e.g., AlarmNet) 112. For example, AlarmNet is a nation-wide company that contracts with local security firms and communications companies to provide security reporting services. In the case of communication companies, AlarmNet contracts with local cellular communication systems for purposes of allowing local security systems to report alarms using the control channels of local base stations of the cellular network.

When using AlarmNet, a local security company provides an alarm panel 102 with a cellular transceiver 116 and often a connection to a local wireline telephone service. The installer programs the alarm panel 102 with a system identifier (e.g., a telephone number) of the reporting system 112, a system identifier of the central station 110 (e.g., again a telephone number) and a system identifier (e.g., an address) 124 of the space 16.

In the event of an alarm, the alarm panel 102 may first attempt to place a wireline call to the central station 110. If a connection is not established within a very short period of time, the panel 102 may initiate a connection through the cellular transceiver 116, the local cellular base station and regional telephone system (the local cellular base station and telephone system together designated by the number 114 in FIG. 2) to the reporting service 112. The reporting service 112 may use the system identifier of the central station 110 to forward the alarm to the central station 110.

Under the illustrated embodiment, a utility company 20 may use the alarm system 100 as the communication system 18 for messages exchanged between the meter 10 and utility company 20. In this case, alarm panel 102 is provided with a short range transceiver 108 that functions as a router in a mesh network under IEEE 802.15.4 where the meter 12 forms a node and sensors 36, 38 form end points.

The alarm panel 102 may be provided with a utility information processor 118 that handles communications to and from the smart system 10. In this case, the installer of the alarm panel 102 programs the utility information processor 118 with a system identifier (e.g., a telephone number) of the utility company 20 and an alarm system identifier (e.g., a telephone number) 122 of the alarm panel 102.

Upon activation of the alarm panel 102, the utility information processor 118 sends a message (e.g., a packet) through the reporting system 112 to the utility company 20 to register the presence of the smart meter 10 with the information processor 44 of the utility company. The registration message may include at least the system identifier 122 of the alarm panel 102, the system identifier 124 of the space 16 and, possibly, a system identifier (e.g., a serial number) of the meter 12.

Once registered, the mesh 46 of the meter 10 may operate as discussed above. For example, meter reading messages from the utility company 20 may be received by the alarm panel 102 through the reporting system 112 and routed to the utility information processor 118. The utility information processor, in turn, may send the messages through the router 108 to the usage processor 30. The usage processor 30 may respond with cumulative or rate of utility usage as requested.

Similarly, once registered, the sensors 36, 38 may notify the fault processor 34 of any detected faults. The fault processor 34 may send immediate notice to the utility company 20 of any faults or compare the current usage of the utility 26 with a threshold value and only report the fault if the usage is above the threshold. As above, the utility company 20 may respond to the fault by dispatching a service vehicle or reporting the event to police or fire departments.

Similarly, the information processor 44 may sent messages to the usage processor 30 regarding load shedding that are forwarded to a controller 28 of devices 22, 24. The messages to the controller 28 may instruct an air conditioner to shut down or the messages may over ride an existing air conditioner temperature set point. For example, the message to the controller 28 may set the air conditioner set point upwards by some predetermined temperature (e.g., from 70° F. to 80° F. degrees) and for some predetermined time period as a method of reducing electrical load during some high load period. If the utility is a gas company, the message may reduce the set point of a furnace by some similar temperature range for some other time period.

A specific embodiment of method and apparatus for reporting faults through a utility meter has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A system comprising:
    a utility meter of a utility company that measures consumption of a utility within a space occupied by a user;
    a wireless fault detector associated with the utility meter located separate from the utility meter that detects a fault associated with usage of the utility within the space;
    a wireless transmitter of the utility meter that receives a wireless fault message from the fault detector, confirms consumption of a minimum threshold usage of the utility within the space and transmits a fault message that identifies the space; and
    a security system that protects the space occupied by the user and that exchanges messages between the wireless transmitter and the utility company including transmitting the fault message to the utility company.

2. The system as in claim 1 wherein the utility meter is a gas meter and the fault detector is a natural gas leak detector.

3. The system as in claim 1 wherein the utility meter is a water meter and the fault detector is a water leak detector.

4. The system as in claim 1 further comprising a communication network that interconnects the utility meter wireless transmitter with the utility company.

5. The system as in claim 4 wherein the communication network further comprises a mesh network coupled between the transmitter and the utility company through a public communication network.

6. The system as in claim 4 wherein the communication network further comprises a high reliability reporting system coupled between the transmitter and the utility company.

7. The system as in claim 6 further comprising a security system disposed within the space coupled to the high reliability reporting system.

8. The system as in claim 7 further comprising a wireless transceiver of the security system that exchanges messages with the utility meter wireless transceiver.

9. The system as in claim 1 further comprising a wireless control transceiver of a utility consuming device located within the space that exchanges wireless messages with the utility meter wireless transceiver.

10. The system as in claim 9 further comprising a control message from the utility company to the utility meter wireless transceiver, the control message is received by the utility wireless transceiver and transferred to the control transceiver to deactivate the utility consuming device.

11. The system as in claim 10 wherein the control message further comprises a load shedding message that changes a temperature set point.

12. A system comprising:
    a utility meter that measures consumption of a utility within a user space;
    a wireless transceiver of the utility meter;
    a wireless fault sensor located separate from the utility meter and wireless transceiver of the utility meter that detects faults in the user space associated with the consumption of the utility within the space and that wirelessly reports detected faults to the transceiver;
    a high reliability reporting system; and
    a security system that protects the user space and is coupled to the transceiver, the security system exchanges messages between the transceiver and utility and that reports the detected faults through the high reliability reporting system to a utility company that supplies the utility.

13. The system as in claim 1 further comprising a security system coupled to a central monitoring station through the high reliability reporting system.

14. The system as in claim 13 wherein the security system, the transceiver and fault sensor further comprise a mesh network.

15. The system as in claim 12 further comprising a fault processor that compares a consumption rate of the utility with a threshold value and upon detecting that the consumption rate exceeds the threshold reports the fault to the utility company.

16. The system as in claim 12 further comprising a fault processor that reports a consumption rate of the utility along with the fault to the utility company.

17. A system comprising:
    a utility meter that measures consumption of a utility within a user space where said utility is provided by a utility company;
    a transceiver of the utility meter;
    a fault sensor that detects faults in the user space associated with the consumption of the utility within the space and that reports detected faults to the transceiver;
    a security panel within a protected space coupled to the transceiver; and
    a high reliability reporting system coupled to the security panel, the security panel configured to report alarm events detected by the security panel within the user space to a central monitoring station of the security panel through the high reliability reporting system; and
    a wireless transceiver of the security panel that exchanges messages between the transceiver of the utility meter and the utility company through the alarm panel and high reliability reporting system and that reports the detected faults to the utility company.

18. The system as in claim 17 wherein the utility further comprises natural gas.

19. The system as in claim 17 wherein the utility further comprises water.

20. The system as in claim 17 wherein the utility further comprises electricity.

21. The system as in claim 17 further comprising the utility company sending a load shedding message to an air conditioner over riding a temperature set point.

* * * * *